Dec. 26, 1944.　　　　D. R. CONNELL　　　　2,365,746
MACHINE FOR FORMING SCREW-THREADS IN CAPS OR CLOSURES
Filed March 26, 1943　　　5 Sheets-Sheet 4

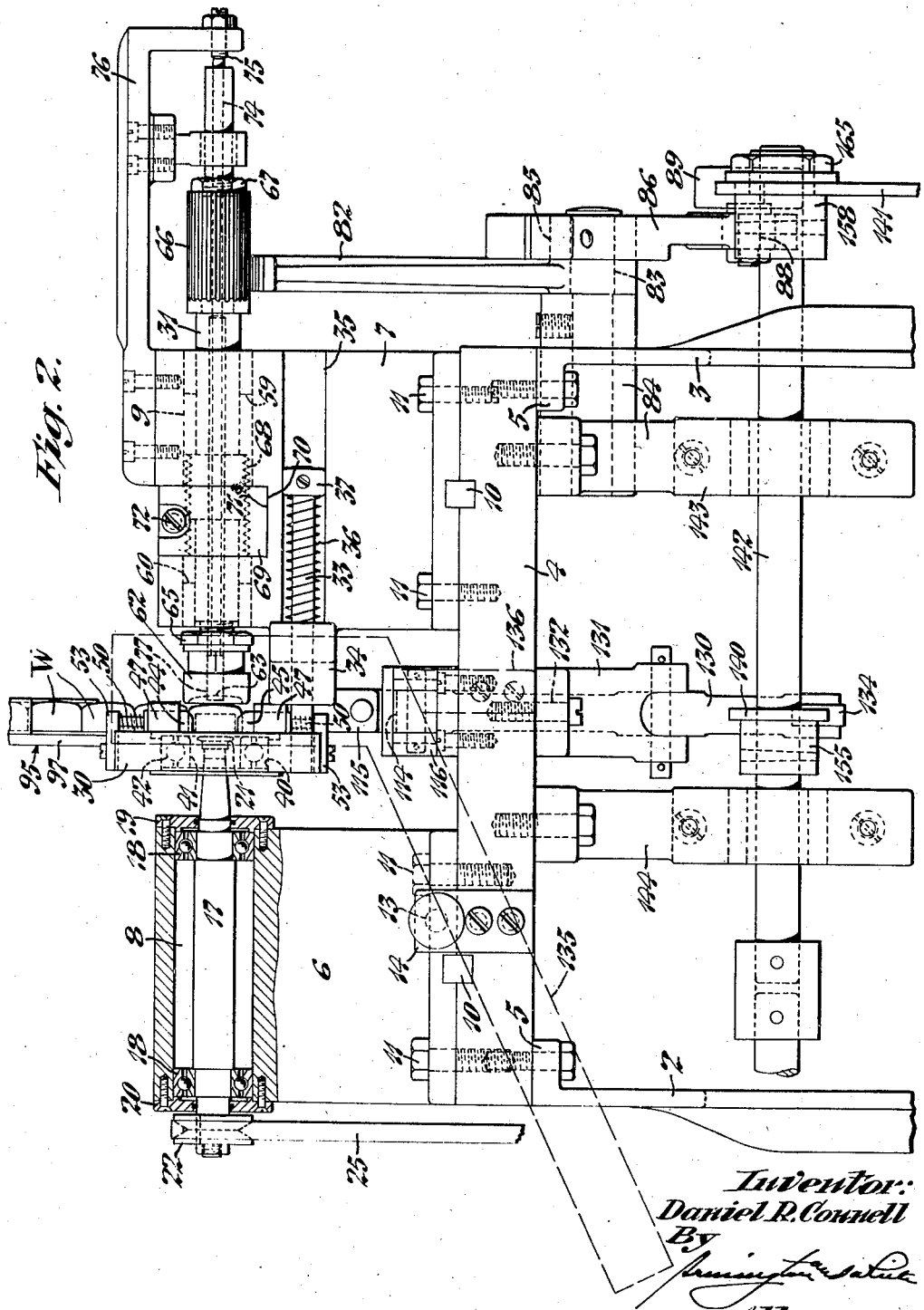

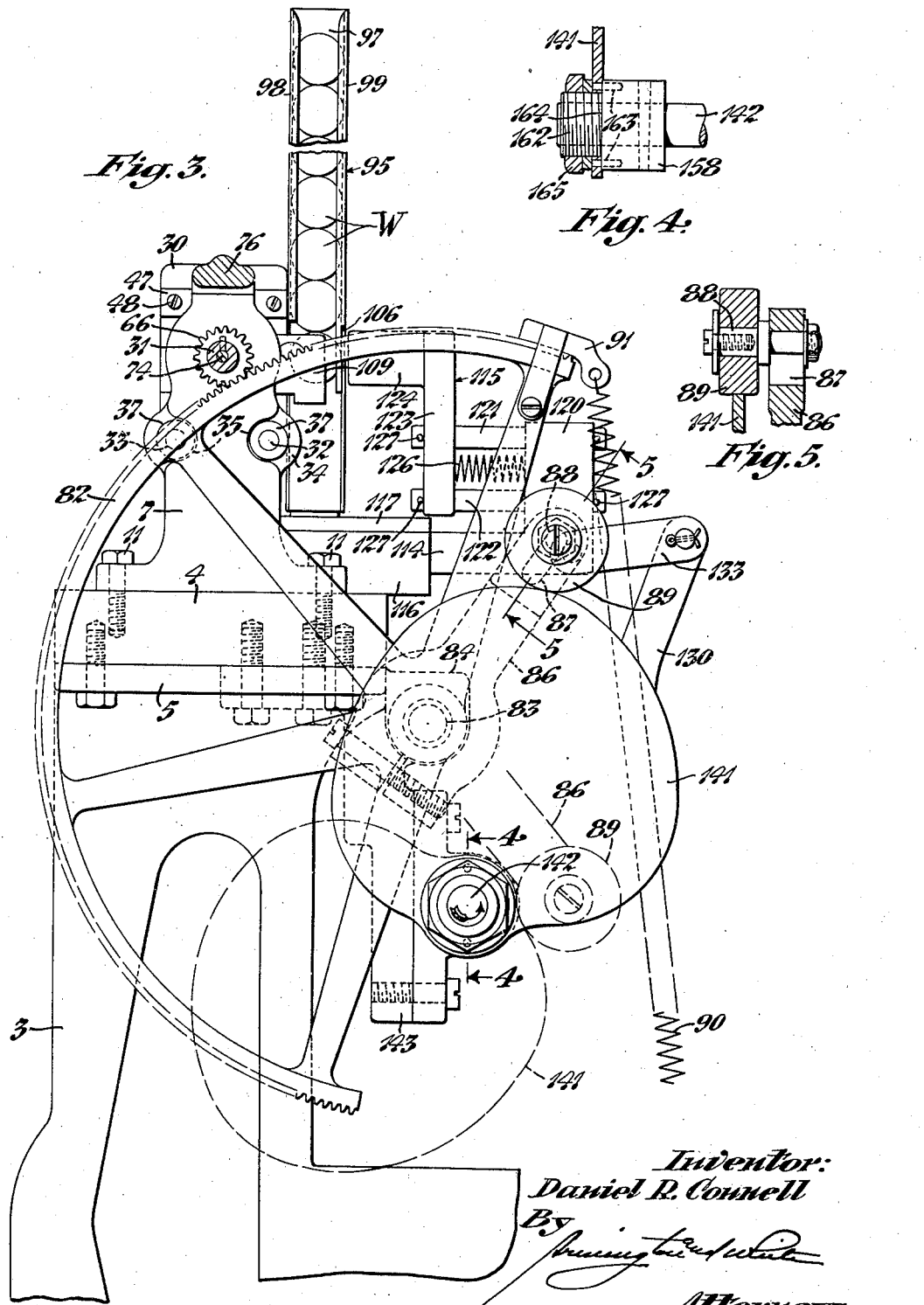

Inventor:
Daniel R. Connell
By
Attorneys.

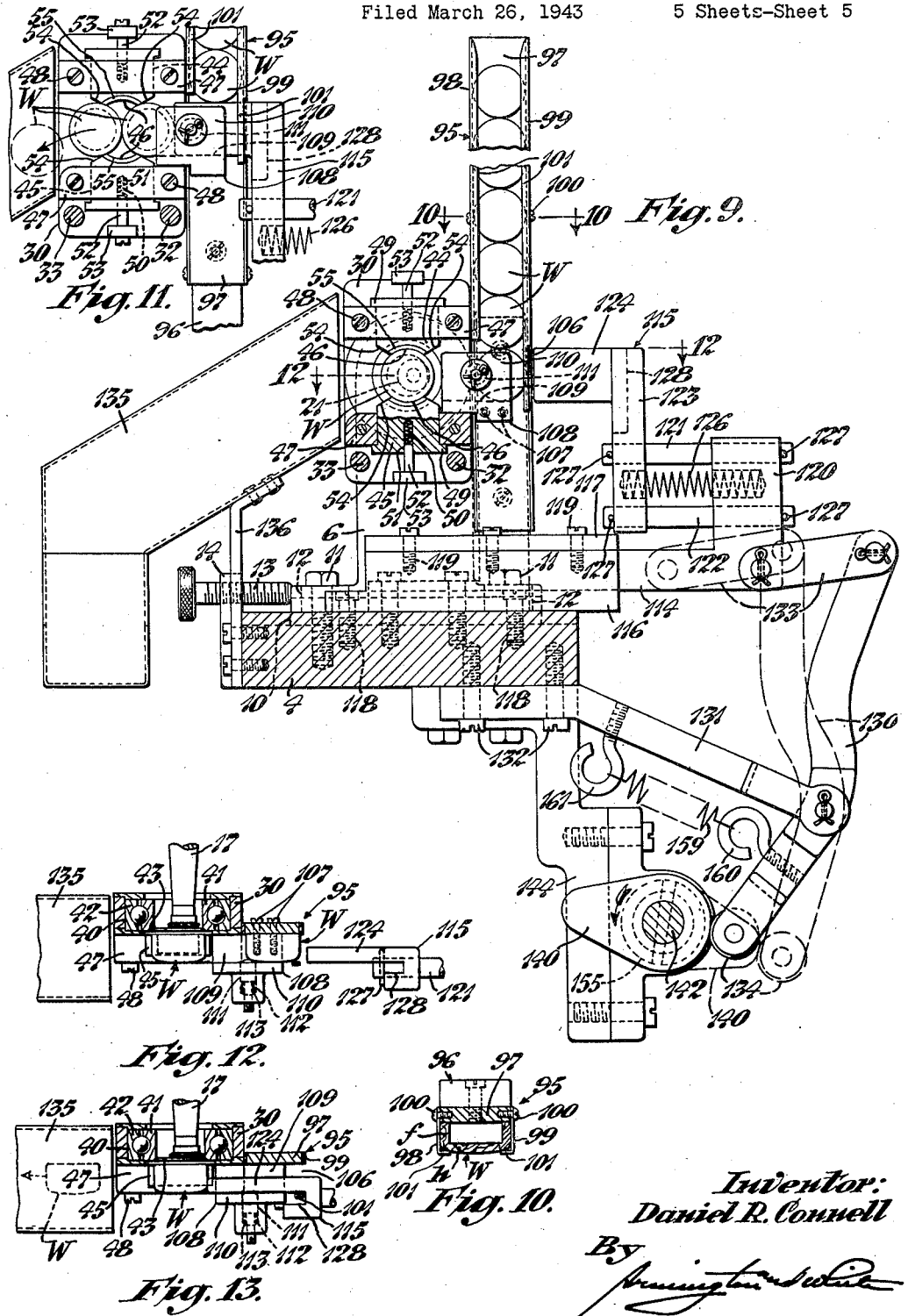
Dec. 26, 1944.  D. R. CONNELL  2,365,746
MACHINE FOR FORMING SCREW-THREADS IN CAPS OR CLOSURES
Filed March 26, 1943  5 Sheets-Sheet 5
Inventor:
Daniel R. Connell
By
Attorneys.

Patented Dec. 26, 1944

2,365,746

UNITED STATES PATENT OFFICE 2,365,746

MACHINE FOR FORMING SCREW THREADS IN CAPS OR CLOSURES

Daniel R. Connell, Lowell, Mass., assignor to U. S. Bobbin & Shuttle Company, Providence, R. I., a corporation of Rhode Island Application March 26, 1943, Serial No. 480,643

9 Claims. (Cl. 10—154)

The present invention relates to thread-cutting machines and more particularly to a machine for cutting screw-threads in the bores of cylindrical articles, such as closures or caps for bottles, jars, tubes and the like.

One of the objects of the present invention is to provide a machine of the type indicated having a work-holder and a cutting tool arranged eccentrically to engage the periphery of the tool and the bore in the work tangentially to cut a groove in the latter.

Another object is to provide a machine of the type indicated in which the eccentricity of the cutting tool and work-holder may be adjusted to engage the periphery of the tool with the bore of the work and regulate the depth of the cut.

Another object is to provide a machine of the type indicated in which the tool and work-holder are relatively movable through a helical path to cut a screw-thread in the bore of the work.

Another object is to provide a machine of the type indicated having a magazine for holding a supply of the articles to be threaded and means for transferring the articles one at a time from the magazine to the work-holder.

Another object is to provide a machine of the type indicated which operates automatically to transfer articles from the magazine to the work-holder and relatively move the work-holder and tool to cut the threads in the bore of the articles.

Another object is to provide a machine of the type indicated in which the transferring means and means for relatively moving the work-holder and cutting tool are operated in timed relationship to first transfer an article to the work-holder and thereafter cut the thread.

Still another object is to provide a machine of the type indicated which is of relatively simple and compact construction to adapt it for economical manufacture and one which is entirely automatic in operation requiring only the supplying of articles to the magazine.

Further objects of the invention are set forth in the following specification which describes a preferred form of construction of the machine, by way of example, as illustrated by the accompanying drawings. In the drawings:

Fig. 2 is an enlarged elevational view of the opposite side of the machine showing the relationship of the chuck on the feed-shaft and the work-holder for receiving and clamping a cap-blank therebetween;

Fig. 3 is an end view of the machine showing the driving means for rotating the feed-shaft;

Fig. 4 is a sectional view on line 4—4 of Fig. 3 showing the means for mounting the feed-operating cam on the cam-shaft;

Fig. 5 is a sectional view on line 5—5 of Fig. 3 showing the means for mounting the cam-follower roll on the operating arm;

Fig. 9 is a transverse sectional view through the machine showing the transfer slide for automatically transferring cap-blanks from the magazine to the work-holder;

Fig. 10 is a sectional view on line 10—10 of Fig. 9 showing the form of the magazine for supporting and feeding cap-blanks into position to be engaged by the transfer slide;

Fig. 11 is a detailed view of the magazine and work-holder showing a cap-blank as being transferred to the latter and a threaded cap as being discharged therefrom;

Fig. 12 is a part-sectional plan view of the work-holder and magazine showing the transfer slide in its inoperative position; and Fig. 13 is a view similar to Fig. 12 showing the transfer slide as in position after being operated to transfer a cap-blank from the magazine to the work-holder.

Figure 6:
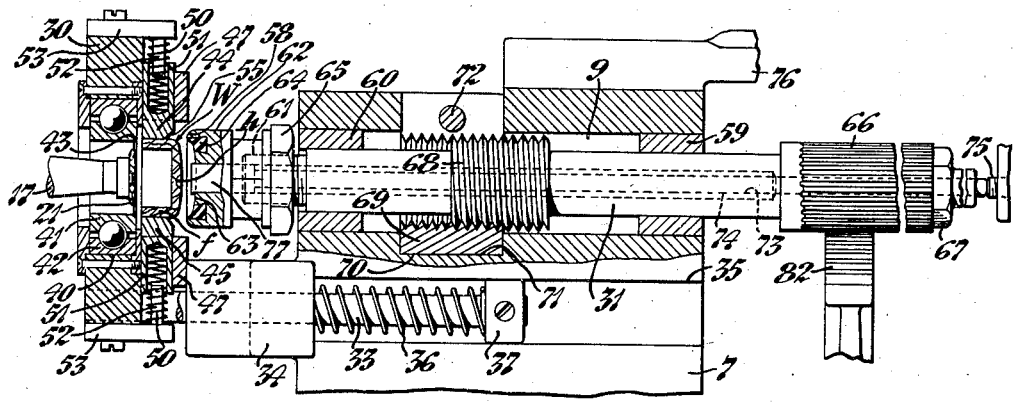
Fig. 6 is an enlarged part-sectional view of the work-holder and feed-shaft illustrating the screw-threads on the feed-shaft which cooperate with the stationary nut on the stationary bearing bracket to advance the shaft axially during its rotation.

The machine of the present invention is particularly adapted and designed for cutting screw-threads in the bore of hollow cylindrical articles such as closures or caps for bottles, jars, tubes or the like. As illustrated in Figs. 6 and 10 of the drawings the caps W may have a convex top-wall $h$ and a cylindrical flange or skirt $f$ depending from the top. While a particular form of article to be threaded is illustrated in the present drawings it is to be understood that the machine may be employed to cut threads on either the inner or outer surface of cylindrical articles of various types.

Figure 1:
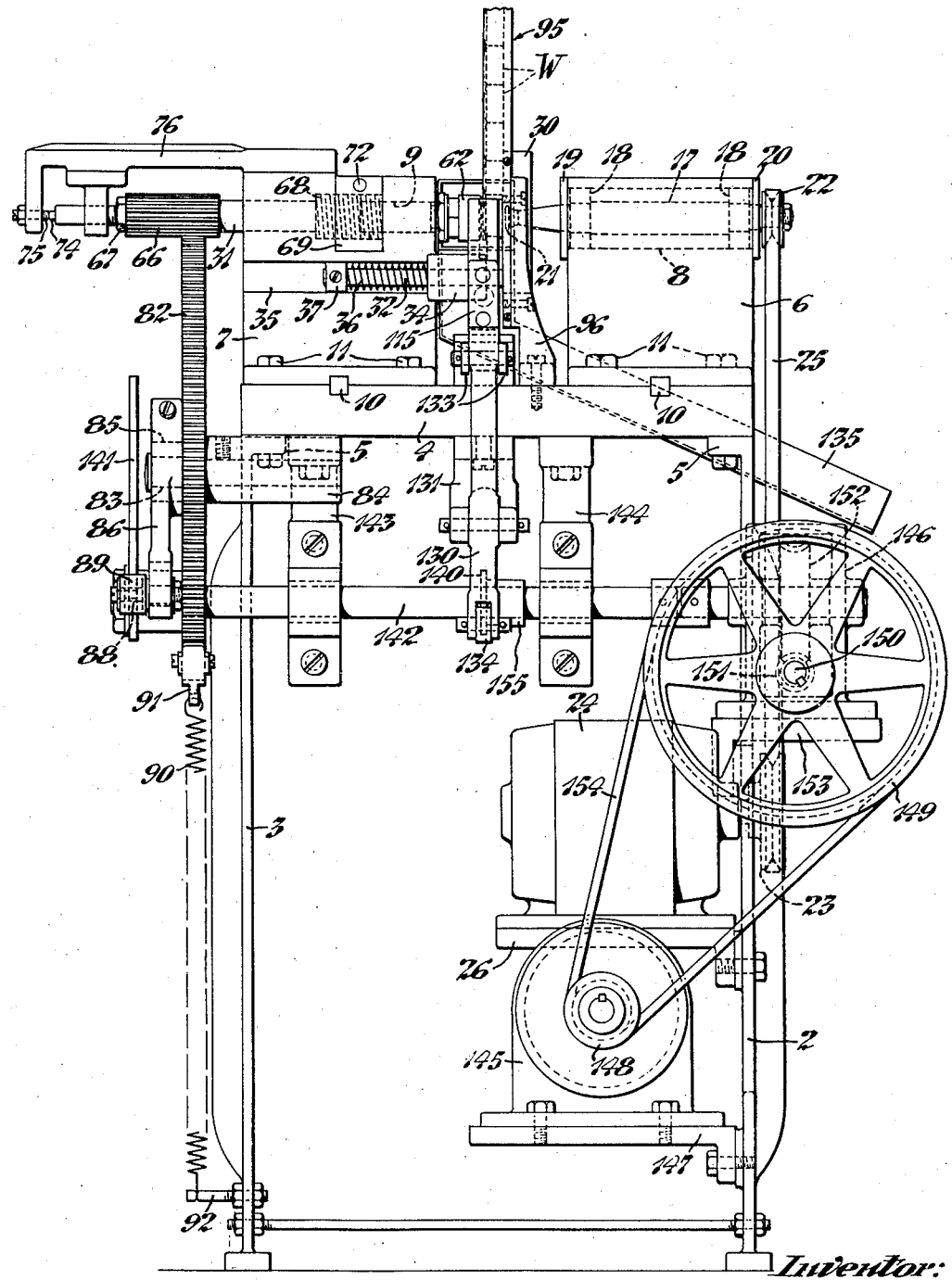
Fig. 1 is an elevational view of one side of a machine incorporating the novel features of the present invention.

Referring to Fig. 1 of the drawings, the machine may be mounted on a frame having spaced legs 2 and 3 supporting a table or bed 4 bolted to inwardly-directed flanges 5 at the upper ends of the legs. Mounted on the bed or table 4 are spaced bearing brackets 6 and 7 provided with longitudinal bores 8 and 9, respectively, with their axes located in the same horizontal plane. The bearing brackets 6 and 7 are accurately located in spaced relationship on the table 4 by means of keys 10 to maintain the axes of the bores in parallel relationship. The bearing brackets 6 and 7 are fastened to the table 4 by means of bolts 11 and the bearing bracket 6 is provided with slots 12 through which the bolts extend to adapt it to be adjusted laterally with respect to the bearing bracket 7, see Fig. 9. For convenience in adjusting the bearing bracket 6 a thumb-screw 13, see Figs. 2 and 9, is mounted for rotation in a support 14 attached to the side of the table 4 with its end engageable with the side of the bracket.

A tool-arbor 17 extends through the bore 8 in the bearing bracket 6 and is mounted for rotation in anti-friction bearings 18 therein, see Fig. 2. The tool-arbor 17 projects beyond the ends of the bearing bracket 6 which are provided with oil-retaining rings 19 and 20 surrounding the peripheries of the projecting ends of the arbor. A circular cutting tool 21 mounted on the forward end of the arbor 17 has teeth on its periphery of a form suitable for cutting thread grooves in the bore of the cap-blank W. The opposite end of the tool-arbor 17 mounts a pulley 22 which may be driven from a pulley 23 on the shaft of a motor 24 by means of a belt 25, see Fig. 1. As illustrated in the present drawings, the motor 24 is mounted on a platform or bracket 26 supported on the inside of the leg 2 of the frame. Thus the tool-arbor 17 and cutting tool 21 at its inner end may be continuously driven at relatively high speed from the motor 24.

Figure 7:
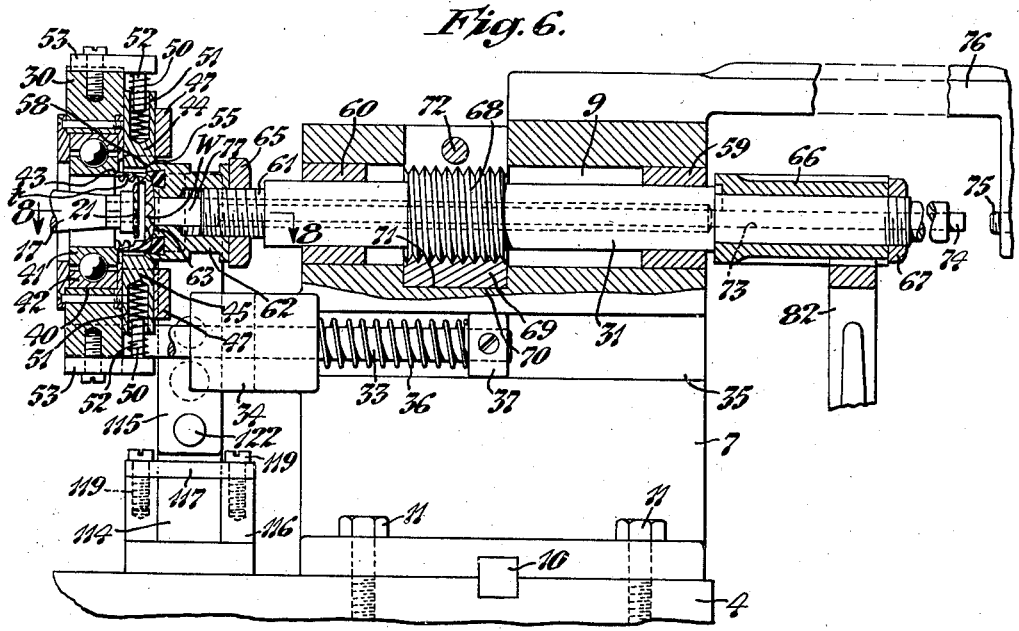
Fig. 7 is a sectional view similar to Fig. 6 showing a cap-blank clamped between the work-holder and chuck at the end of the feed-shaft and illustrating the work as advanced through a helical path with respect to the periphery of the cutting tool to cut an internal thread in the bore of the cap.
Figure 8:
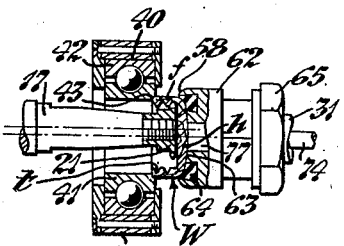
Fig. 8 is a sectional plan view on line 8—8 of Fig. 7 showing the eccentricity of the axis of the cutting tool with respect to the axis of the work-holder for adapting the periphery of the tool to engage the bore of the cap tangentially thereof.

The bearing bracket 7 mounts a work-holder 30 and feed-shaft 31 located with their axes in laterally offset or eccentric relation to the axis of the tool-arbor 17, see Figs. 1, 2 and 8. The work-holder 30 comprises a rectangular plate mounted vertically on a pair of rods 32 and 33 extending at right-angles to the plane of the plate, see Figs. 3, 9 and 11. The rods 32 and 33 extend through and are adapted to slide in bosses 34 projecting forwardly from the bearing bracket 7, and at the rear of bosses 34 the sides of the bracket have recesses 35 for receiving the rods. The work-holder 30 is yieldingly held in its retracted position illustrated in Fig. 2 by means of springs 36 surrounding the rods and acting between the bosses 34 and collars 37 fastened to the end of the rods. As shown most clearly in Figs. 6, 7 and 11, the work-holder plate 30 has a central opening 40 in which is mounted an annulus or ring 41 journaled in a ball-bearing 42. The ring 41 has a groove 43 at the forward edge of its inner circumference for engagement with the outer periphery of the skirt f of the cap-blank W as shown in Fig. 7. The forward end of the tool-arbor 17 and the cutting tool 21 extend through the central opening of the ring 41 in position for the tool to engage tangentially with the inner surface of the skirt f of the cap-blank W, see Fig. 8.

Mounted on the side of the work-holder plate 30 are a pair of opposed centering jaws 44 and 45, see Figs. 6 and 9. The jaws 44 and 45 are of identical construction having arcuate recesses 46 at their inner ends of a contour corresponding to the outer periphery of the cap-blank W. The jaws 44 and 45 are mounted to slide in U-shaped guides 47, see Figs. 11 and 13, attached to the side of the plate 30 by means of screws 48. The jaws 44 and 45 are provided with abutments 49 at their outer ends which extend laterally for cooperation with the sides of the guides 47 to limit the inward movement of the jaws toward each other. The jaws 44 and 45 are yieldingly urged inwardly toward each other by springs 50 seated in pockets 51 in the jaws and acting between the bottom of the pockets and pins 52 mounted in flat strips 53 fastened to the plate 30 at the top and bottom thereof, see Fig. 1. The jaws 44 and 45 thus are urged inwardly toward each other to yieldingly engage their inner recessed ends 46 with the opposite sides of a cap-blank W, but are adapted to be retracted against the action of the springs 50 to release the cap. The sides of each jaw 44 and 45 adjacent the circular recess 46 are beveled to provide cam-faces 54 and the lower rearward edge of each jaw adjacent the circular recess also is beveled to provide a cam-face 55.

The feed-shaft 31 extends through the bore 9 in the bearing bracket 7 and is mounted for rotation and axial movement in bushings 59 and 60 in the bore, see Fig. 6. The shaft 31 is arranged in axial alinement with the axis of the ring 41 of the work-holder 30 and its reduced end 61 is threaded to receive a chuck 62 screwed onto the threads. The chuck 62 is formed with a concaved recess 63 corresponding to the convex curvature of the top of the cap-blank W for engagement therewith. An insert 64 of resilient material such as rubber is positioned in an annular groove in the concaved recess of the chuck for gripping engagement with the top of the cap-blank W. The edge of the chuck 62 surrounding the recess 63 is beveled to provide an annular cam-face 58 for cooperation with the cam-faces 55 at the inner ends of the jaws 44 and 45. The chuck 62 is held in adjusted position on the threaded end 61 of the shaft 31 by means of a check-nut 65.

Mounted on the end of the feed-shaft 31 which projects rearwardly from the bearing bracket 7 is a splined pinion-gear 66. The pinion-gear 66 is preferably keyed to the reduced end of the shaft 31 and clamped in place thereon by means of a nut 67. Intermediate its ends the feed-shaft 31 is formed with screw-threads 68 which mesh with the threads of a stationary nut 69 mounted in a recess in the bearing bracket 7 to cause the shaft to advance axially as it is rotated. The nut 69 has a flat bottom face 70 which cooperates with a correspondingly-shaped seat 71 in the bearing bracket 7 to prevent its rotation and the nut is split to adapt it to be adjusted by a set-screw 72 to compensate for wear and prevent backlash of the shaft. The axial advance of the shaft 31 acts to clamp the cap-blank W between the chuck 62 and the ring 41 of the work-holder and thereafter move the clamped blank forwardly with respect to the cutting tool 21, see Fig. 7.

Extending longitudinally through an axial bore 73 in the feed-shaft 31 is an ejector-rod 74. The rearward end of the ejector-rod 74 is engageable with an adjustable abutment 75 in the form of a set-screw, see Fig. 2, in the depending end of a bracket 76 fastened to the top of the bearing bracket 7. The forward end of the ejector-rod 74 has an enlarged head or contact-member 77 which projects through the bore of the chuck 62. Thus, upon retraction of the feed-shaft 31 the rearward end of the ejector-rod 74 will engage the abutment 75 to cause the head 77 at its forward end to engage the closure-cap W and positively release it from the concaved face 63 of the chuck 62 as the latter is withdrawn rearwardly.

The feed-shaft 31 is caused to be rotated by a segment-gear 82 mounted for oscillation on a stud 83, see Figs. 1 and 3, supported by a bracket 84 bolted to the under side of the table 4 of the machine frame. The teeth on the periphery of the segment-gear 82 mesh with the teeth of the pinion-gear 66 on the feed-shaft 31. The hub 85 of the segment-gear 82 projects laterally therefrom at one side and mounted fast thereon is a crank-arm 86. Adjustably mounted in a slot 87 at the end of the crank-arm 86 is a stud 88 carrying a follower-roll 89 journaled thereon, see Figs. 3 and 5. The segment-gear 82 normally is rocked in clockwise direction, as viewed in Fig. 3, by a spring 90 connected at one end to a member 91 fastened to its rim and anchored at its opposite end on a pin 92 projecting laterally from the leg 3 of the machine frame. The segment gear 82 is caused to be rocked positively in counterclockwise direction by cam-means, later to be described, which operates on the follower-roll 89 and arm 86.

The cap-blanks W to be threaded are delivered from a magazine 95 mounted on a bracket 96 on the table 4 of the machine frame at one side of the work-holder 30, see Figs. 1 and 9. The magazine 95 is in the form of a vertical raceway comprising a back-plate 97 with flanges 98 and 99 attached to the sides thereof by means of screws 100, see Fig. 10. The side flanges 98 and 99 have narrow inturned lips 101 for engaging across the upper rim of the cap-blanks W and the lips are so spaced from the back plate 97 as to receive the blanks only when the edges of their skirts *f* are positioned against the back-plate 97 with their convex tops *h* projecting forwardly between the lips. Consequently, improper insertion of the cap-blanks in reversed position in the raceway is prevented.

As shown in Fig. 9, the side flange 98 of the magazine 95 extends only to the bottom edge of the upper guide-bracket 47 on the work-holder 30 while the opposite side flange 99 has a slot or opening 106 in its side in substantial alinement with the opening between the opposed ends of the jaws 44 and 45. Mounted on the back-plate 97 of the magazine 95 by means of screws 107 is an L-shaped bracket 108 provided with a ledge or shelf 109 which forms a bottom for the magazine raceway adjacent the work-holder 30 and a vertical side flange 110 for guiding the cap-blanks W as they are transferred to the work-holder 30. Mounted on the vertical flange 110 of the bracket 108 is a yieldable detent 111, see Fig. 13, in the form of a plunger-pin actuated by a helical spring 112 in a pocket 113 for restraining the lowermost cap-blank W from movement toward the work-holder 30, but yielding to permit a blank to be transferred from the magazine 95 to the work-holder 30 by positive action thereagainst.

The cap-blanks W are delivered to the work-holder 30 from the magazine 95 by a transfer slide 114 carrying a pusher-element 115 yieldingly mounted thereon, see Fig. 9. The transfer slide 114 is formed with a rectangular base-portion mounted to reciprocate in a box-like bearing comprising a channel-shaped member 116 attached to the table 4 by screws 118 with a cover 117 fastened to the side walls of the member by screws 119. At the end of the slide 114 is a vertical stanchion 120 with spaced bearing apertures in which a pair of rods 121 and 122 are slidably mounted. The pusher-element 115 comprises an upright portion 123 with bearing apertures through which the rods 121 and 122 project and a horizontally-extending blade-portion 124 of rectangular shape adapted to reciprocate in the opening 106 in the side flange 99 of the magazine 95. Thus the stanchion 120 of the transfer slide 114 mounts the rods 121 and 122 which, in turn, mount the pusher 115. Extending between the upright portion 123 of the pusher 115 and the stanchion 120 on the slide 114 is a helical spring 126 held in suitable pockets at its ends and adapted to yieldingly maintain the pusher in advanced relation on the slide. The forward movement of the pusher 115 on the slide 114 is limited by cross-pins 127 at the ends of the rods 121 and 122 engaging the sides of the stanchion 120 and the pusher. As shown in Figs. 11 to 13 the upright portion 123 of the pusher 115 has a groove 128 adjacent the blade 124 to provide a clearance for the side flange 99 of the magazine adjacent the opening 106.

The transfer slide 114 is arranged to be reciprocated by a lever 130 pivoted intermediate its ends on a bracket 131 fastened to the under side of the table 4 of the machine frame by screws 132. The upper end of the lever 130 is connected to the slide 114 by a pair of links 133 while the lower end of the lever carries a follower roll 134 for actuation by means later to be described. Upon rocking movement of the lever 130 in counterclockwise direction from the position shown in full lines to that indicated by dash-lines in Fig. 9, the transfer slide 114 and pusher 115 will be moved forward to cause the blade 124 to enter the slot 106 in the side 99 of the magazine 95 and advance the lowermost cap-blank W from the magazine into the work-holder 30 in the manner indicated in Fig. 11. A chute 135 for receiving the threaded closure-caps discharged from the work-holder 30 and delivering them from the machine is mounted on a bracket 136 fastened to the table 4 at the opposite side of the work-holder from the magazine 95.

The transfer slide 114 and feed-shaft 31 are operated in timed relation to each other by cams 140 and 141, respectively, mounted on a continuously-driven cam-shaft 142. As shown in Fig. 1, the cam-shaft 142 is journaled in bearings in a depending arm 143 of the supporting bracket 84 and a second bearing bracket 144 depending from the table 4 of the machine frame. The cam-shaft 142 is driven continuously at low speed from a motor 145 through reduction gearing in a casing 146. The motor 145 is mounted on a bracket 147 fastened to the leg 2 of the machine frame and has a relatively small pulley 148 on its shaft which drives a larger pulley 149 fast on a worm-shaft 150 of the reducing gearing by means of a belt 154. The worm-shaft 150 has a worm-gear 151 fast thereon which meshes with a worm-wheel 152 on the cam-shaft 142. The worm-shaft 150, worm-gear 151 and worm-wheel 152 are enclosed in the casing 146 and constitute a self-contained unit mounted on a platform 153 supported from the leg 2 of the machine frame.

The cam 140, see Fig. 9, has its hub 155 pinned to the cam-shaft 142 and arranged with its peripheral edge engaged by the follower-roll 134 on the lever 130. The follower-roll 134 is yieldingly held in engagement with the peripheral edge of the cam 140 by means of a spring 159 connected to a screw-eye 160 on the lever and anchored to a screw-eye 161 on the bracket 131. The periphery of the cam 140 has a dwell extending around substantially two-thirds of its periphery which permits the lever 130 to remain in its inoperative position shown by full lines in Fig. 9, and a lobe extending through substantially one-third of its periphery for actuating the lever through an operative stroke to the position indicated by dash-lines.

The cam 141 is in the form of a sheet-metal plate arranged with its peripheral edge engaged by the follower-roll 89 on the actuating arm 86 of the segment-gear 82, see Fig. 3. The cam 141 is mounted on the reduced threaded end 162 of a hub 158 pinned to the cam-shaft 142, see Fig. 4, and held rotatively therewith by means of dowel-pins 163 in the end of the hub. The cam 141 is clamped against the shoulder 164 on the hub by means of a nut 165 screwed onto its reduced threaded end. The cams 140 and 141 may take other forms, but as herein illustrated the cam 140 is designed to actuate the transfer slide 114 to transfer a cap-blank W from the magazine 95 to the work-holder 30 during approximately one-third of a revolution of the cam-shaft 142 while the actuating arm 86 and the segment gear 82 remain inactive. The rotation of the cam 141 is then rendered operative to oscillate the crank-arm 86 and segment gear 82 to successively rotate the feed-shaft 31 in opposite directions during approximately two-thirds of a rotation of the cam-shaft 142 while the transfer slide 114 and pusher 115 dwell in the inoperative position illustrated in Fig. 9. One form of the invention having been described in detail, the mode of operation of the complete machine is explained as follows.

To adapt the machine for cutting threads on the interior of the skirts f of the cap-blanks W the bearing bracket 6 may be adjusted laterally with respect to the bearing bracket 7 by loosening the screws 11 and turning the adjusting screw 13, see Figs. 2 and 9. The adjusting screw 13 is turned until the eccentricity of the axis of the tool-arbor 17 with respect to the axis of the work-holder ring 41 is such as to cause the periphery of the cutting tool 21 to engage the interior of the skirt f of the blank W tangentially to cut a thread groove of the proper depth therein. During the lateral adjustment of the bearing bracket 6 the key 10 holds the bracket from turning whereof to maintain the axis of the tool-arbor 17 parallel to the axis of the work-holder ring 41. When properly adjusted the bearing bracket 6 is clamped to the table 4 of the machine frame by tightening the screws 11.

The electric motor 24 may be energized by closing a suitable switch, not herein shown, to cause it to drive through the belt 25 to rotate the tool-arbor 17 at a high rate of speed. A supply of cap-blanks W is inserted manually into the magazine raceway 95 through its open top with the edges of their skirts f adjacent the back plate 97. The cap-blank W thus will be caused to drop by gravity in the magazine raceway 95 to position the lowermost blank on the ledge 109 of the bracket 108 in alinement with the blade 124 of the pusher 115. The electric motor 145 then may be energized to start the thread-cutting operation.

Upon energization of the electric motor 145 the pulley 148 on the end of its shaft will drive through the belt 154 to rotate the pulley 149 and shaft 150 of the reduction gearing in the casing 146, see Fig. 1, and the worm-gear 151 on the shaft 150 will drive the worm-wheel 152 to rotate the cam-shaft 142 at a relatively slow rate of speed. During the turning of the cam-shaft 142 the cam 140 will be rotated in counterclockwise direction, as viewed in Fig. 9, to cause its lobe to rock the lever 130 from the position shown by full lines in Fig. 9 to that indicated in dash-lines. The rocking movement of the lever 130 thus will be transmitted through the links 133 to actuate the transfer slide 114 and pusher 115 through an operative stroke. Operation of the transfer slide 114 and pusher 115 will cause the blade 124 of the pusher to slide through the opening 106 in the side flange 99 of the raceway or magazine 95 and across the latter to push the lowermost cap-blank W laterally from the magazine toward the work-holder 30, the detent-pin 111 yielding to permit passage of the blank thereacross. If for any reason the cap-blank W should jam or otherwise be prevented from moving from the magazine 95 the spring 126 will yield to permit continued movement of the transfer slide 114 relatively of the pusher 115 so as to prevent breakage of or damage to the parts.

During the transfer of the cap-blank W from the magazine 95 to the work-holder 30 the forward side of the blank will engage the oppositely beveled cam-faces 54 on the centering jaws 44 and 45 to cause the latter to separate against the action of the springs 50 in the manner indicated in Fig. 11. At the end of the operative stroke of the pusher 115 the cap-blank W will be located between the arcuate recesses 46 in the opposed ends of the jaws 44 and 45 and the jaws will be forced toward each other by the springs 50 to clamp them against the blank and hold it in axial alinement with the ring 41. As the rounded point of the lobe of the cam 140 rides past the follower 134 the spring 159 will rock the lever 130 in clockwise direction, as viewed in Fig. 9, from the position indicated by dash-lines to that illustrated in full lines to return the transfer slide 114 and pusher 115 to their inoperative position. Upon retraction of the pusher-blade 124 from the magazine 95 the cap-blanks W stacked in the raceway will drop by gravity to position the lowermost blank in alinement with the blade. The reciprocation of the transfer slide 114 and pusher 115 through their operative and return strokes will occur during approximately one-third of a revolution of the cam-shaft 142.

Immediately upon completion of the transfer of a cap-blank W to the jaws 44 and 45 of the work-holder 30 the cam 141 on the cam-shaft 142 will operate to rock the crank-arm 86 to rotate the segment-gear 82 connected thereto in counterclockwise direction as viewed in Fig. 3. During the rotation of the segment-gear 82 in counterclockwise direction the pinion-gear 66 and feed-shaft 31 will be rotated in clockwise direction. Due to the meshing engagement of the screw-threads 68 on the feed-shaft 31 with the threads in the nut 69, see Fig. 6, the rotation of the shaft will cause a simultaneous forward axial movement thereof. Axial movement of the feed-shaft 31 will engage the concaved face 63 of the chuck 62 with the top h of the cap-blank W and the beveled end 58 of the chuck will engage the cam-faces 55 of the jaws 44 and 45 to withdraw them from the sides of the blank.

The forward movement of the feed-shaft 31 acts finally to clamp the cap-blank W between the chuck 62 and the work-holder ring 41, the outer periphery of the skirt *f* of the blank seating in the groove 43 in the ring. As the blank W is clamped between the ring 41 of the work-holder 30 and the chuck 62 it will be rotated by the chuck and moved axially forward with respect to the rotating cutting tool 21 as the feed-shaft continues to rotate whereby to cause the cutting tool to cut a helical thread-groove *t* in the inner surface of the skirt *f* of the blank. During the combined axial and rotary movement of the cap-blank W the rods 32 and 33 of the work-holder 30 will slide in the bosses 34 of the bearing bracket 7 against the action of the springs 36 and the ring 41 will rotate freely in the ball-bearing 42 in the work-holder.

At the end of the rotary movement of the feed-shaft 31 in clockwise direction as controlled by the shape of the cam 141, see Fig. 3, the cutting tool 21 will have completed the cutting of the thread-groove *t* in the interior of the skirt *f* of the blank W as indicated in Fig. 8. At this point, due to the receding profile of the cam 141 the spring 90 will rock the segment-gear 82 in the opposite or clockwise direction as viewed in Fig. 3, while the follower-roll 89 travels in a direction toward the axis of the cam. Rocking movement of the segment-gear 82 in clockwise direction will rotate the feed-shaft 31 in counter-clockwise direction and the meshing engagement of the screw-threads 68 on the shaft with the threads in the nut 68 will cause the shaft to be withdrawn axially to return it to its initial position, see Figs. 6 and 7. During such rearward axial movement of the feed-shaft 31 the springs 36 will act between the collars 37 on the supporting rods 32 and 33 and the bosses 34 of the bearing bracket 7 to slide the work-holder 30 rearwardly with the chuck 62 to retain the cap-blank W clamped between the ring 41 and the chuck. Since the axial movement of the feed-shaft 31 is proportional to its rotary movement as controlled by the pitch of the screw-threads 68 the threaded cap will be moved rearwardly through the same path as during its forward movement. That is to say, as the threaded cap is moved rearwardly to retract it from the tool 21 it is rotated in the opposite direction from that in which it is turned to cut the thread so that the tool will ride out of the threads in a direction the reverse of that during the thread-cutting operation. Adjacent the end of the retractive movement of the feed-shaft 31 the rearward face of the work-holder 30 will engage the forward side of the bosses 34 on the bearing bracket 7 whereby to permit relative movement of the chuck 62 with respect to the work-holder to release the cap from the chuck, see Fig. 6. At the instant the chuck 62 is withdrawn from the cam-faces 55 on the jaws 44 and 45 the jaws will be closed against the cap to clamp against and yieldably hold it in fixed position.

To insure disengagement of the threaded cap from the chuck 62 the rearward end of the ejector rod 74 is arranged to engage the adjustable abutment 75 during the rearward axial movement of the feed-shaft 31 to cause its head 77 to be projected forwardly through the chuck to positively eject the threaded cap therefrom. The rotary and rearward axial movement of the feed-shaft 31 is controlled by the receding profile of the cam 141 as it rotates in counter-clockwise direction as viewed in Fig. 3, the cam being operative during substantially two-thirds of a revolution of the cam-shaft 142 to cause the feed-shaft 31 to be advanced through its forward and return strokes. During the remaining one-third revolution of the cam-shaft 142 the crank-arm 86 and segment-gear 82 have a dwell with the follower-roll 89 riding on the concentric portion of the cam 141. The feed-shaft 31 thus will be caused to remain at rest while each cap-blank W is inserted into the work-holder and the finished cap ejected therefrom in the manner as next explained.

After the completion of a thread-cutting operation the cam 140, see Fig. 9, again operates to rock the lever 130 and reciprocate the transfer slide 114 and pusher 115 to transfer the lower-most cap-blank W from the magazine 95 to the work-holder 30. As each new cap-blank W is transferred from the magazine 95 to a position between the jaws 44 and 45 it will engage the side of the threaded cap held therein and move it laterally from the work-holder 30 in the manner illustrated in Fig. 11 to eject it therefrom. The discharged threaded cap will then fall by gravity through the chute 135 to be received in a suitable receptacle placed therebeneath. The machine continues to operate in the manner explained above to transfer cap-blanks W from the magazine 95 to the work-holder 30 during substantially one-third of a revolution of the cam-shaft 142 and to clamp the cap-blank and move it relatively to the rotating cutting tool 21 during substantially two-thirds of a revolution of the cam-shaft.

It will be observed from the foregoing description that the present invention provides a thread-cutting machine in which the periphery of the rotating cutting tool engages the interior surface of the skirt of a cap-blank tangentially as the blank is moved with respect to the tool to cut a thread therein. It also will be observed that the present invention provides a machine which is automatically operative to feed and thread cap-blanks, requiring only the supplying of blanks to the magazine. It still further will be observed that the machine of the present invention is positive in its operation and requires little or no attention on the part of the operator.

While a preferred embodiment of the invention is illustrated and described herein, it is to be understood that modifications may be made in the form and construction of the parts thereof without departing from the spirit or scope of the invention. Therefore, without limiting myself in this respect, I claim:

1. In a machine of the type indicated, means for supporting a cylindrical work-piece, means for rotating the work-piece in a certain direction, a rotary tool for cutting a groove in the work-piece, means for rotating the tool, means for relatively moving the cutting tool and work-supporting means to cut a screw-thread in the work-piece, means operative thereafter for relatively moving the tool and work-support to disengage the tool from the work-piece, and means for simultaneously rotating the work-piece in the opposite direction from that first mentioned to free the tool from the threads in the work-piece.

2. In a machine of the type indicated, a work-holder for mounting a cap-blank having a hollow cylindrical skirt, a cutting tool mounted for rotation about an axis eccentric to the axis of the work-holder to adapt the periphery of the tool to engage the interior of the skirt of the blank tangentially thereof, means for rotating the cutting tool, means for simultaneously rotating and axially moving the work-holder in one direction to cut a screw-thread in the skirt of the blank, and means for rotating the work-holder in the opposite direction upon completion of the thread-cutting operation and simultaneously withdrawing it from the tool to free the latter from the threads in the blank.

3. In a machine of the type indicated, a work-holder for supporting a cap-blank having a hollow cylindrical skirt, a magazine for holding a supply of blanks, means for transferring a blank from the magazine to the work-holder, a cutting tool mounted for rotation about an axis eccentric to the axis of the work-holder to adapt the periphery of the tool to engage the interior of the skirt of the blank, means for rotating the cutting tool, feeding means for simultaneously rotating and axially moving the work-holder with respect to the cutting tool to cut a helical thread in the interior of the blank, means for operating the transferring means and feeding means in timed relation to first transfer a blank to the work-holder and thereafter cut the thread in the skirt thereof, and means for rotating the work-holder in the opposite direction from that first mentioned and simultaneously withdrawing it from the tool to release the latter from the threads in the blank.

4. In a machine of the type indicated, a work-holder for supporting a cap-blank having a hollow cylindrical skirt, a magazine for holding a supply of blanks, a reciprocable slide for transferring blanks laterally from the magazine into alinement with the work-holder, a cutting tool mounted for rotation about an axis eccentric to the axis of the work-holder to adapt its periphery to engage the interior of the skirt of the blank, means for rotating the cutting tool, feeding means for simultaneously rotating and axially moving the work-holder with respect to the cutting tool to cut a thread in the interior of the skirt of the blank, and means for operating the reciprocable slide and feeding means in timed relation to first transfer a blank to the work-holder and thereafter cut the thread in the skirt thereof.

5. In a machine of the type indicated, a work-holder for supporting a cap-blank having a hollow cylindrical skirt, a magazine for holding a supply of blanks, means for transferring blanks from the magazine to the work-holder, a cutting tool mounted for rotation about an axis eccentric to the axis of the work-holder to adapt the periphery of the tool to engage the interior of the skirt of the blank, means for rotating the cutting tool, feeding means for simultaneously rotating the work-holder in one direction and feeding it axially with respect to the tool to cut a helical thread in the skirt of the blank, a cam-shaft, cams on the cam-shaft for operating the transferring means and feeding means in timed relation to first transfer a blank to the work-holder and thereafter cut the thread in the skirt thereof, and means for rotating the work-holder in the opposite direction from that first mentioned and simultaneously withdrawing it from the tool to release the latter from the threads in the blank.

6. In a machine of the type indicated, a chuck, a work-holder for cooperation with the chuck to clamp a cylindrical blank in axial alinement with the chuck, a magazine for holding a supply of blanks, means for transferring a blank from the magazine into position between the chuck and the work-holder, a cutting tool mounted for rotation about an axis eccentric to the axis of the work-holder to adapt the periphery of the tool to engage the blank tangentially thereof, means for rotating the cutting tool, a pinion-gear for rotating the chuck, a segment-gear in meshing engagement with the pinion-gear, means for oscillating the segment-gear to rotate the chuck, and means for moving the chuck axially during rotation thereof whereby to clamp the blank to the work-holder and feed it relatively to the cutting tool to cut a thread in the blank.

7. In a machine of the type indicated, a chuck, a work-holder having an opening therein, a ring mounted for rotation in the opening of the work-holder, said chuck adapted to cooperate with the ring to clamp a cylindrical blank therebetween, a magazine for holding a supply of blanks, means for transferring a blank from the magazine into position between the chuck and the ring, a cutting tool mounted for rotation about an axis eccentric to the axis of the chuck to adapt the periphery of the tool to engage the blank tangentially thereof, means for rotating the cutting tool, means for operating the chuck to clamp a blank to the ring of the work-holder and thereafter move the blank relatively of the cutting tool, and cams for operating the transferring means and chuck in timed relation.

8. In a machine of the type indicated, a work-holder for releasably supporting a cylindrical blank, a magazine for holding a supply of blanks, a slide for transferring a blank from the magazine to the work-holder, a chuck, means for operating the chuck to clamp the blank against the work-holder, a cutting tool, means for actuating the chuck to rotate the blank, and means for effecting relative feeding movement between the blank and cutting tool to cut a helical thread in the blank.

9. In a machine of the type indicated, a chuck, a work-holder for supporting a blank concentrically of the chuck, a magazine for holding a supply of blanks, a slide for transferring the blanks from the magazine to the work-holder, means for moving the chuck to engage the blank held in the work-holder, a cutting tool, means to actuate the chuck to rotate the blank held in the work-holder, means for relatively feeding the blank and tool to cut a thread in the blank, and means to reciprocate the slide to transfer a blank from the magazine to the work-holder and simultaneously eject a previously-threaded blank therefrom.

DANIEL R. CONNELL.